(12) United States Patent
Buterbaugh

(10) Patent No.: US 12,339,356 B2
(45) Date of Patent: Jun. 24, 2025

(54) TRAFFIC CONTROL DEVICE INCLUDING A DISTANCE DETECTOR

(71) Applicant: Honda Motor Co., Ltd., Tokyo (JP)

(72) Inventor: Christopher A. Buterbaugh, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 18/185,680

(22) Filed: Mar. 17, 2023

(65) Prior Publication Data

US 2024/0310514 A1 Sep. 19, 2024

(51) Int. Cl.
| | |
|---|---|
| *G01S 13/931* | (2020.01) |
| *B60R 21/013* | (2006.01) |
| *G01B 11/02* | (2006.01) |
| *H04W 4/029* | (2018.01) |

(52) U.S. Cl.
CPC .......... *G01S 13/931* (2013.01); *B60R 21/013* (2013.01); *G01B 11/026* (2013.01); *H04W 4/029* (2018.02)

(58) Field of Classification Search
CPC .... G01S 13/931; H04W 4/029; B60R 21/013; G01B 11/026
See application file for complete search history.

(56) References Cited

U.S. PATENT DOCUMENTS

| | | | |
|---|---|---|---|
| 6,456,904 B1 * | 9/2002 | Gay ..................... | G09B 19/167 701/1 |
| 9,727,923 B2 * | 8/2017 | Teh ....................... | H04W 12/06 |
| 10,156,636 B1 * | 12/2018 | Minorics ................. | B60R 1/12 |
| 10,632,395 B1 | 4/2020 | Davis | |
| 10,702,784 B2 | 7/2020 | Kim et al. | |
| 10,789,838 B2 | 9/2020 | Amacker | |
| 2009/0256739 A1 * | 10/2009 | Teshirogi ............... | G01S 7/032 342/204 |
| 2015/0254976 A1 * | 9/2015 | Wu ......................... | G08G 1/04 340/937 |
| 2016/0366543 A1 * | 12/2016 | Berry ...................... | H04B 1/40 |
| 2017/0302970 A1 * | 10/2017 | Dudko ................. | H04W 4/029 |
| 2018/0322944 A1 * | 11/2018 | Valdizan ............... | G16H 10/60 |
| 2018/0348012 A1 * | 12/2018 | An ...................... | B60R 16/0236 |
| 2019/0001227 A1 * | 1/2019 | Bloemsma ............ | A63G 21/04 |
| 2020/0118431 A1 * | 4/2020 | Amacker ............... | G08G 1/094 |
| 2020/0338464 A1 * | 10/2020 | Pipitone .............. | G05D 1/0246 |
| 2020/0388165 A1 * | 12/2020 | Lubrano ............. | G08G 5/0069 |
| 2021/0020039 A1 | 1/2021 | Johnson et al. | |
| 2021/0237777 A1 * | 8/2021 | Selevan ................ | G06V 20/56 |
| 2022/0407361 A1 * | 12/2022 | Ikemura ................. | B60L 53/32 |

(Continued)

FOREIGN PATENT DOCUMENTS

| | | | |
|---|---|---|---|
| CN | 210395156 U | 4/2020 | |
| CN | 210658105 U | 6/2020 | |
| CN | 113002396 A * | 6/2021 | ............... B60P 1/04 |

(Continued)

*Primary Examiner* — Chico A Foxx

(74) *Attorney, Agent, or Firm* — Plumsea Law Group, LLC

(57) ABSTRACT

A traffic control device may include a distance module configured to detect a distance to an object, an impact detection module configured to detect an impact on the traffic control device, and a communications module configured to transmit at least one of the distance or the impact to a remote processor.

14 Claims, 8 Drawing Sheets

(56) References Cited

U.S. PATENT DOCUMENTS

2024/0171944 A1* 5/2024 Hollar .................. H01M 10/46
2025/0012024 A1* 1/2025 Butterworth, III ..... E01F 9/654

FOREIGN PATENT DOCUMENTS

| CN | 214783436 U | | 11/2021 |
| CN | 118259271 A | * | 6/2024 |
| EP | 3507785 A1 | | 7/2019 |
| JP | 3128402 U | | 1/2007 |
| KR | 101927031 B1 | | 12/2018 |
| WO | WO-2019069104 A1 | * | 4/2019 |

* cited by examiner

TRAFFIC CONTROL DEVICE INCLUDING A DISTANCE DETECTOR

BACKGROUND

1. Field of the Disclosure

The present disclosure relates to sensors for a traffic control device, and more particularly to a traffic control device including a distance detector.

2. Description of Related Art

In the sport of autocross, a race course for vehicles, typically automobiles, is defined through an environment using cones. A driver typically wants achieve a lowest time through the race course, without striking any of the cones. At any corner in the race course, a racing line may be a fastest line or arc through the corner. A trajectory of the racing line may depend on a shape of the corner and a speed of the vehicle approaching the corner. In some of these corners, the driver is aiming to move a wheel of the vehicle as close as possible to certain cones without hitting the cones, in order to achieve a lowest time through the race course.

Currently, there is no way for the driver to receive quantitative data of how close the vehicle came to the cones during a run through the race course. Quantative data may assist the driver in reducing the distance between the vehicle and certain cones on subsequent runs through the race course, and/or may inform the driver of cones that were nearly struck which may help the driver to avoid time penalties on subsequent runs through the race course.

SUMMARY OF THE INVENTION

Embodiments of the present disclosure are directed to a traffic control device including a distance detector. In one aspect, a traffic control device may include a distance module configured to detect a distance to an object, an impact detection module configured to detect an impact on the traffic control device, and a communications module configured to transmit at least one of the distance or the impact to a remote processor.

In some aspects, the distance module may include a distance sensor. In some aspects, the distance sensor may include a transmitter and a receiver. In some aspects, the distance sensor may be a Light Detection and Ranging (LiDAR) device, a light emitting diode (LED) time-of-flight sensor, an infrared (IR) distance sensor, or an ultrasonic sensor.

In some aspects, the impact detection module may include an accelerometer.

In some aspects, the communications module may include at least one of a wireless data transmitter or a wireless data receiver.

In some aspects, the wireless data receiver may be configured to receive identification data corresponding to the object.

In some aspects, the communications module may be further configured to transmit the identification data.

In some aspects, the traffic control device may include a processor connected to the distance module, the impact detect module, and the communications module, and a battery providing power to the processor, the distance module, the impact detect module, and the communications module.

In some aspects, the traffic control device may include a location and movement tracking module.

In some aspects, the remote processor may include at least one of an in-vehicle computer and a remote server remote from the traffic control device.

In some aspects, the remote server may be configured to automatically transmit at least one of the distance and the impact to a user device.

In some aspects, the remote server may be configured to automatically make at least one of the distance and the impact available to a user device.

In one aspect, a method of determining a distance between a traffic control device and a vehicle may include initializing the traffic control device, detecting a change in a distance between the traffic control device and the vehicle passing the traffic control device, and communicating the distance to a remote processor.

In some aspects, the initializing may include connecting the traffic control device with at least one of a remote processor or another traffic control device.

In some aspects, the initializing may include receiving a signal indicating that a run of a course has commenced.

In some aspects, the method may include detecting that the traffic control device is not upright and sending a signal to a remote processor indicating that the traffic control device is not upright.

In one aspect, a method of tracking a vehicle may include initializing a plurality of traffic control devices, wherein the traffic control devices are configured to determining a distance to the vehicle and record a timestamp at which a minimum distance is recorded, sending a start signal to the plurality of traffic control device, receiving a minimum distance and a timestamp from at least two of the plurality of traffic control devices, generating a map of the plurality of traffic control devices, and generating, using, the minimum distances and the timestamps, a representation of a line of the vehicle.

In some aspects, the method may include receiving an indication from at least one of the plurality of traffic control devices that the traffic control device is not upright and adding a penalty to a run time associated with the vehicle to determine a final run time.

In some aspects, the method may include sending the minimum distances and the timestamps to a user device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

There is a need in the art for a traffic control device including a distance detector.

Figure 1:
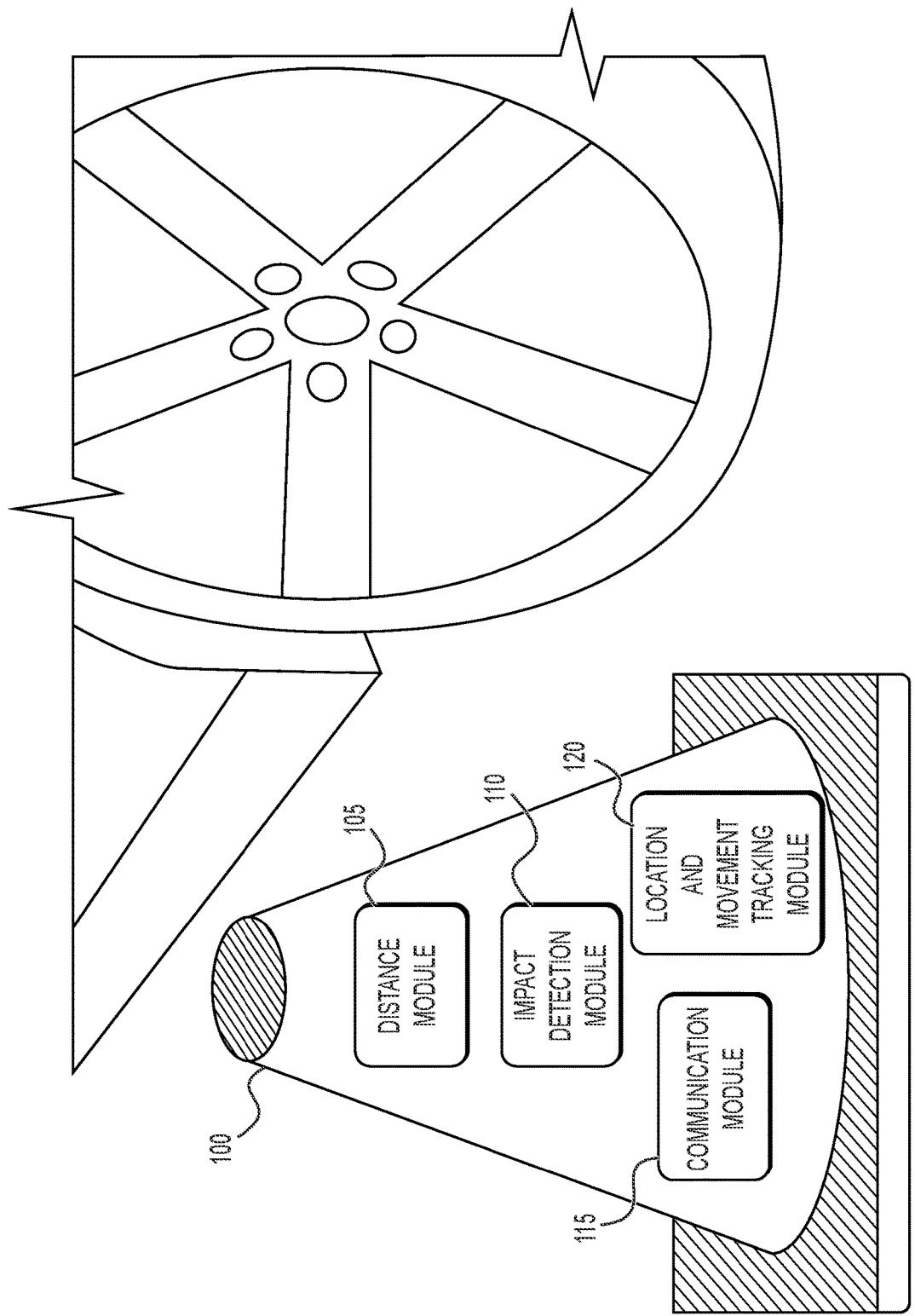
FIG. 1 illustrates a traffic control device according to some embodiments.

According to some embodiments, a traffic control device includes one or more modules. For example, the traffic control device may include a distance module, an impact detection module, and a communications module. FIG. 1 illustrates a traffic control device 100 according to some embodiments.

The traffic control device 100 may be a traffic cone, a traffic drum, a delineator post, a channelizer cone, or a barricade. Traffic control device 100 may be used in connection with traffic control for parking lots, roadways, expressways, and freeways. The traffic control device 100 may function to attract driver attention, which may increase a time for response to road designs and conditions. The traffic control device 100 may be used to, for example, direct traffic away from pedestrians, bystanders, and infrastructure. The traffic control device 100 may be formed from a polyvinylchloride (PVC), a polyethylene, or a polypropylene, for example.

According to some embodiments, the traffic control device 100 may include the distance module 105, the impact detection module 110, and the communications module 115. The modules of the traffic control device 100 may be, for example, integrated into a single unit, for example, as a system-on-chip, connected by a bus 235, or disposed as a collection of wireless devices.

The distance module 105 may determine and record a distance between the traffic control device 100 and a vehicle. For example, the distance module 105 may determine and record a shortest distance between the traffic control device 100 and the vehicle as the vehicle passes the traffic control device 100.

Figure 2:
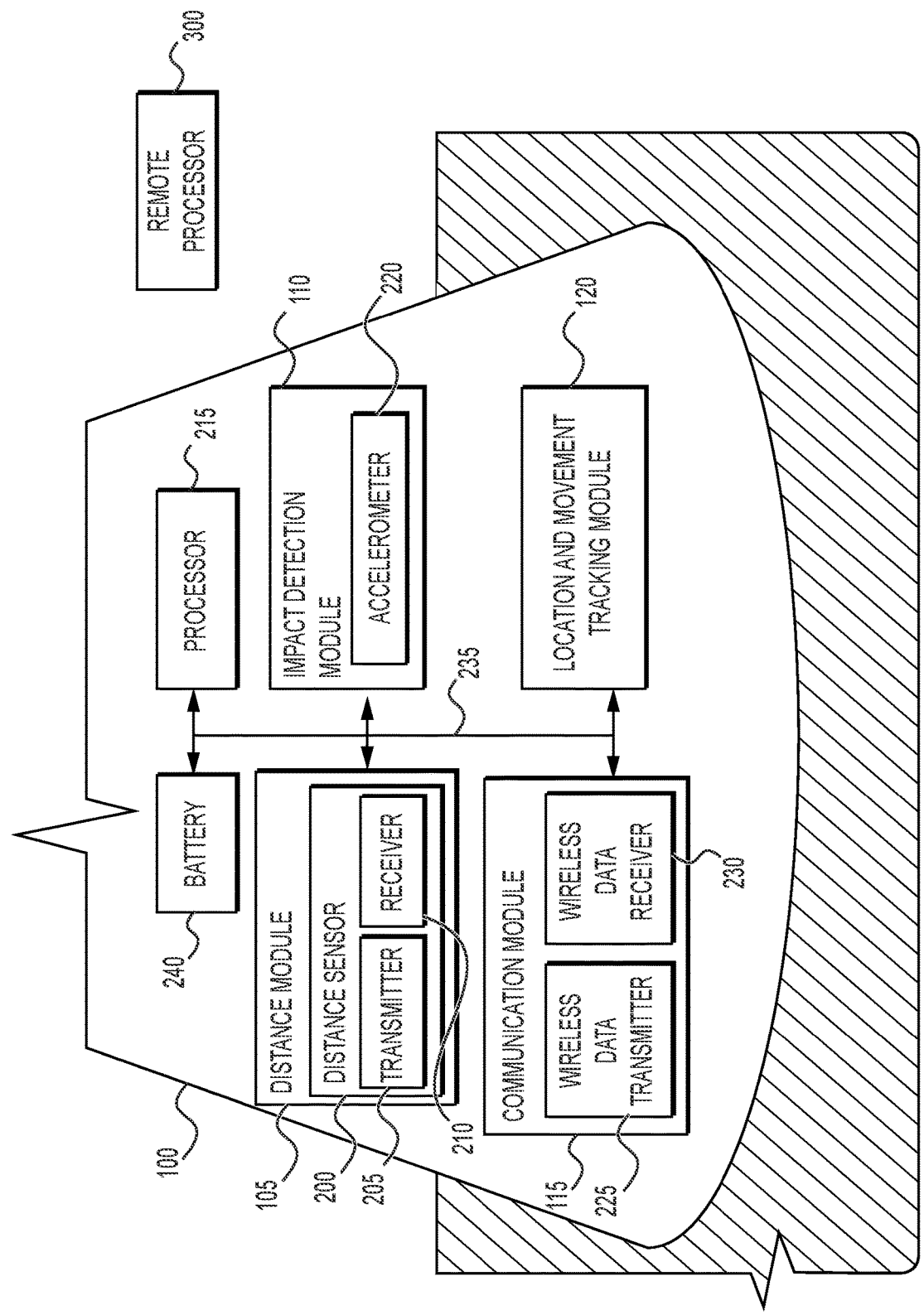
FIG. 2 illustrates a traffic control device according to some embodiments.

Referring to FIG. 2, the distance module 105 may include a distance sensor 200. More particularly, the distance sensor 200 may be a Light Detection and Ranging (LIDAR) device, a light emitting diode (LED) time-of-flight sensor, an infrared (IR) distance sensor, or an ultrasonic sensor. The distance sensor 200 may include, for example, a transmitter 205 and a receiver 210.

The transmitter 205 may transmit, for example, light or sound. For example, the transmitter 205 may transmit a laser light, an infrared (IR) light, or an ultrasonic wave. The receiver 210 may receive a reflected signal or a reflected wave, originally transmitted by the transmitter 205. Herein, a reflected signal may refer to a reflected signal or a reflected wave. A distance to an object, such as a vehicle, may be determined based on a change in intensity of the signal between transmission and reception. A distance to an object may be determined based on a time between transmission and reception of the signal.

Determinations of distance may be performed by a processor of the distance module 105, a processor of the distance sensor 200, or more generally, a processor 215 of the traffic control device 100. In some embodiments, raw data may be transmitted to a remote processor 300 for determination of the distance.

The impact detection module 110 may detect and record impacts on the traffic control device 100. For example, the impact detection module 110 may detect and record a force of an impact. The impact detection module 110 may be, for example, an accelerometer 220.

The accelerometer 220 may detect and record a force that acts on the traffic control device 100. Examples of the accelerometer may include a piezo-electric (PE) accelerometer, a piezo-resistive (PR) accelerometer, or a variable capacitance (VC) accelerometer.

The communications module 115 of the traffic control device 100 may include a wireless data transmitter 225 and a wireless data receiver 230. The communications module 115 of the traffic control device 100 may communicate with the remote processor 300. For example, the communications module 115 may transmit information from the traffic control device 100 to the remote processor 300. The information transmitted by the communications module 115 may include, for example, recorded information from the distance module 105 and recorded information from the impact detection module 110.

Figure 6:
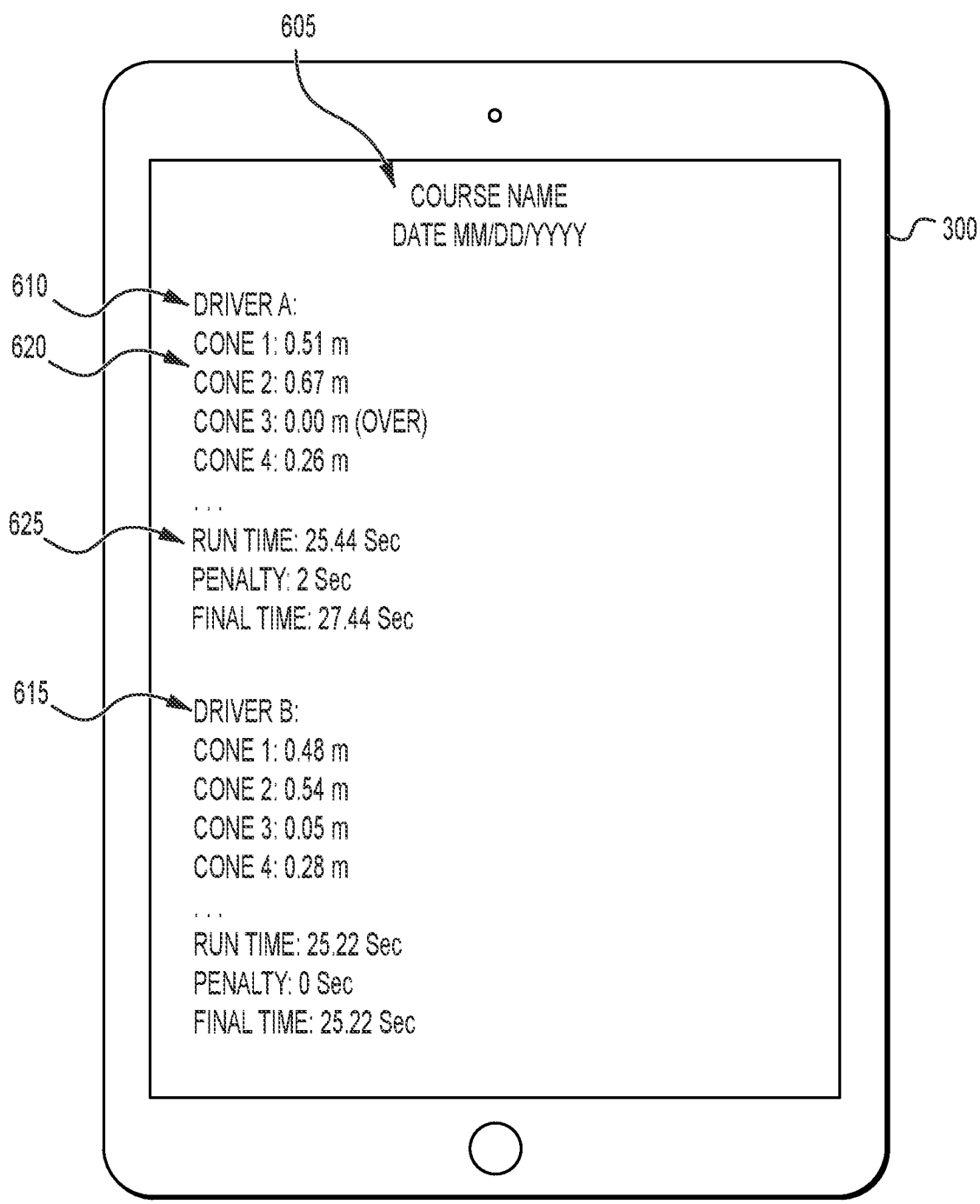
FIG. 6 illustrates a remote processor and a user interface according to some embodiments.

The remote processor 300 may be a processor of a computer, a laptop computer, or a handheld electronic device. The remote processor 300 may be a processor of the vehicle, for example. The remote processor 300 may be a processor of associated with a track or venue. The remote processor 300 may be a remote server, such as a cloud server. The remote processor 300 may store a database logically associating recorded data with one or more vehicles. The recorded data may be stored and processed by the remote processor 300. For example, the remote processor 300 may display the data as illustrated in FIG. 6.

Referring again to FIG. 1, the traffic control device 100 may include other modules. For example, the traffic control device 100 may include a location and movement tracking module 120. The location and movement tracking module 120 may be spatially aware and configured to detect changes in location. For example, the impact detection module 110 may include an ultra-wideband (UWB) sensor. In the example of a UWB sensor, the UWB sensor can determine a relative position of peer devices, for example, other traffic control devices, within a range of up to about 200 meters, updated about 2,000 times per second. In some embodiments, the traffic control device 100 may report their relative positions to the remote processor 300. For example, UWB signals can measure distance with an accuracy up to about 2 centimeters (cm) to about 10 cm (3.9 inches). UWB sensors may be accurate up to about 2 centimeters.

The traffic control device 100 may further include a battery 240. The battery 240 may provide power to the modules. As illustrated, the bus 235 may transmit power and data. In some embodiments, separate buses may be used for power and data.

Figure 3:
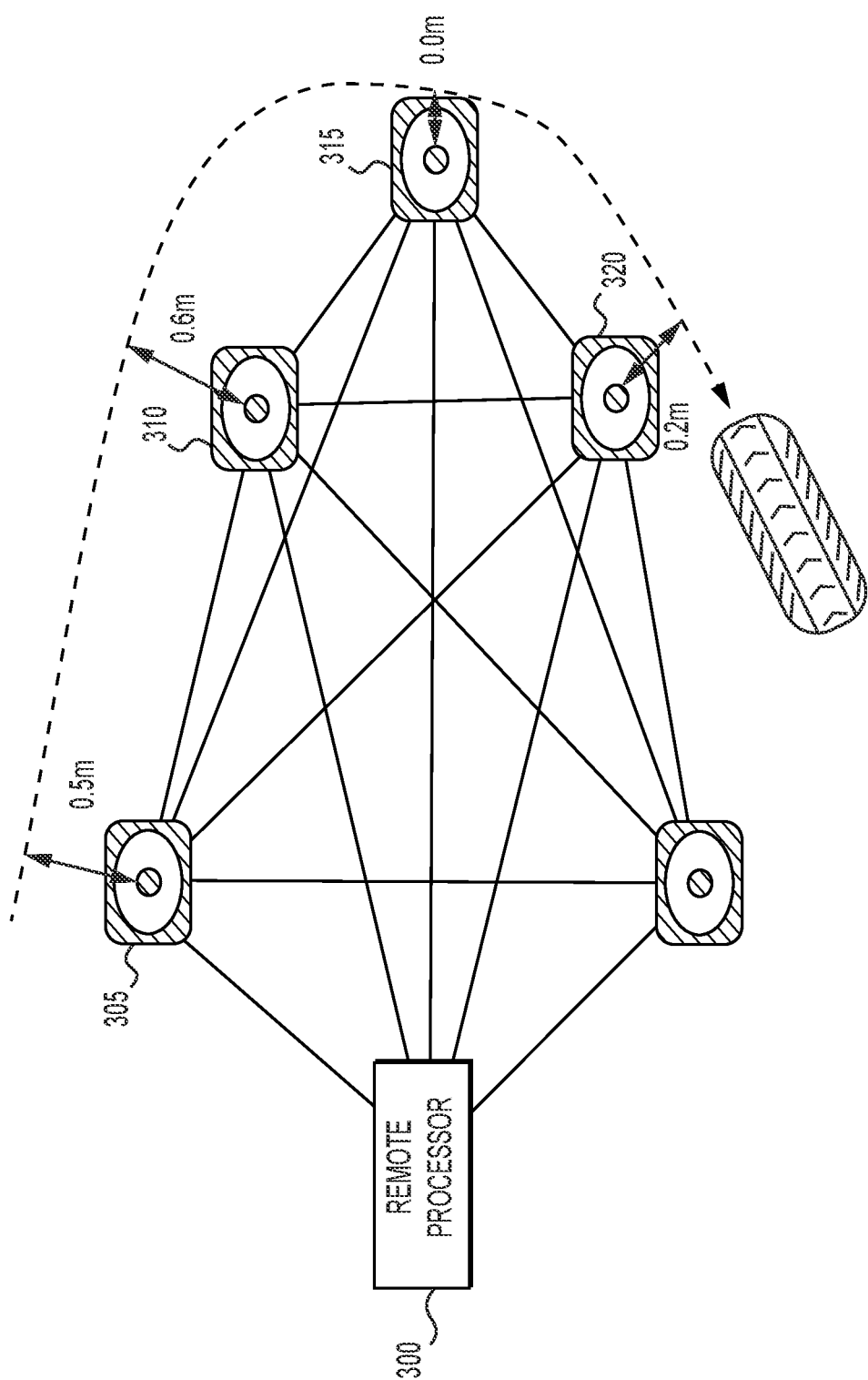
FIG. 3 illustrates a system for tracking a vehicle according to some embodiments.

Referring to FIG. 3, a plurality of traffic control devices may be arranged in an environment. These traffic control devices may include cone 1 305, cone 2 310, cone 3 315, and cone 4 320. The traffic control devices may form a mesh network, configured to exchange data with the remote processor 300. The mesh network may enable the traffic control devices to exchange data with each other. Other network topographies are possible, and a mesh network is merely an example of a topography.

In at least one example embodiment, the traffic control devices may form an ad-hoc network, relaying data to the remote processor 300. The traffic control devices may include UWB sensors. A position of each traffic control device may be determined, for example, using the UWB sensors of the traffic control devices. For example, each UWB sensor may determine a relative position of the traffic control device to the other traffic control devices.

According to some embodiments, the remote processor 300 may generate a map of the course from the data received from the traffic control devices. For example, the remote processor 300 (or user device 700) may generate the map using the relative positions of the traffic control devices and a path that the vehicle takes through the traffic control devices as tracked by those traffic control devices and indicated by recorded timestamps (described herein).

According to some embodiments, if a vehicle causes a traffic control device to fall over or be knocked a distance from the recorded position, a penalty may be added to the time of the run. If a vehicle runs over or bumps a traffic control device and the traffic control device stands back up or doesn't fall over, no penalty may be applied, so long as the traffic control device's position is within a threshold distance (e.g., 0.04 meters (m)) of its initial position, for example as determined by the location and movement tracking module 120. According to some embodiments, the threshold distance may be set during an initialization.

Figure 4:
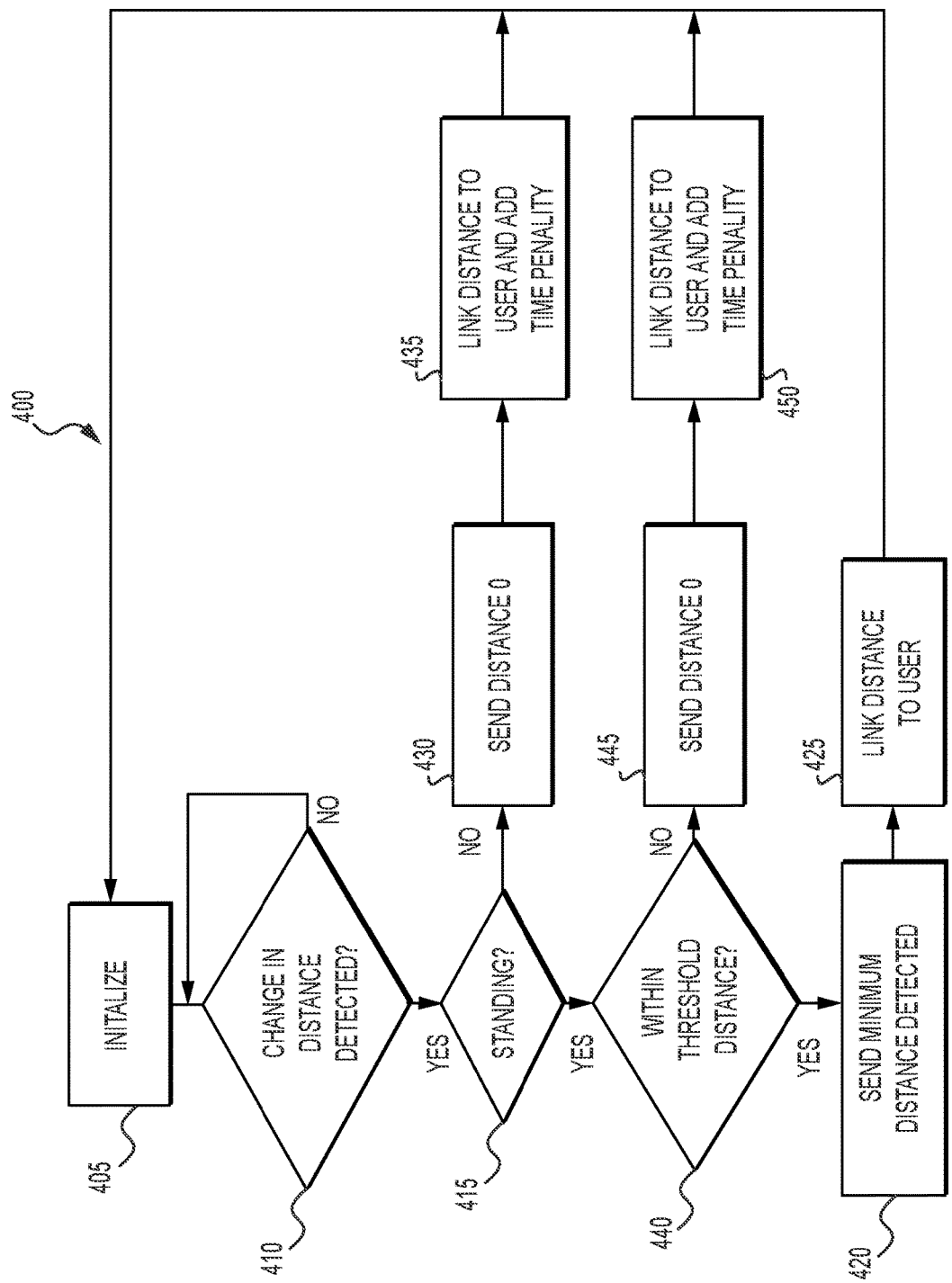
FIG. 4 illustrates a flow diagram of a method according to some embodiments.

Referring to FIG. 4, a method 400 according to an exemplary embodiment may include initializing a traffic control device at step 405. The initialization of the traffic control device may prepare the traffic control device to connect with a remote processor. The initialization of the traffic control device may prepare the traffic control device to connect with other traffic control devices, or other devices. In some examples, the initialization at step 405 may include receiving a signal indicating that a run of a course has commenced.

The method 400 may include detecting a change in a distance to an object at step 410. The method 400 may further include detecting whether the traffic control device is standing (or upright) at step 415.

In a case where the traffic control device is standing, the method 400 may include sending a minimum distance detected during the run to the remote processor at step 420. The method 400 may include linking the recorded data, e.g., the minimum distance detected, to a vehicle or user making the run at step 425. The linking at step 425 may include updating the database. The linking at step 425 may be performed by any processor. For example, the linking at step 425 may be performed by the remote processor 300, the processor 215 of the traffic control device, or another processor, for example, a cloud service.

In a case where the traffic control device is knocked over, the method 400 may include sending a signal to the remote processor at step 430. The signal at step 430 may indicate, for example, that the traffic control device has been knocked over, that the minimum detected distance is "0", or another signal. The method 400 may include linking the recorded data, e.g., the minimum distance detected, to a vehicle or user making the run at step 435. According to some embodiments, the linking at step 435 may include adding a time penalty to the run associated with the vehicle. The linking at step 435 may include updating the database. The linking at step 435 may be performed by any processor. For example, the linking at step 435 may be performed by the remote processor 300, the processor 215 of the traffic control device, or another processor, for example, a cloud service.

According to some example embodiments, the method 400 may include determining whether the traffic control device is within a threshold distance from an initial position at step 440, for example, a position of the traffic control device at initialization. As described herein, the movement may be detected by, for example, the location and movement tracking module 120. If the traffic control device has been impacted and moved a distance greater than the threshold distance at step 440, then the method 400 may include sending a signal to the remote processor at step 445. The signal at step 445 may indicate, for example, that the traffic control device has been moved a distance greater than the threshold distance. The method 400 may include linking the recorded data, e.g., that the traffic control device was move, to a vehicle or user making the run at step 450. According to some embodiments, the linking at step 450 may include adding a time penalty to the run associated with the vehicle.

Figure 5:
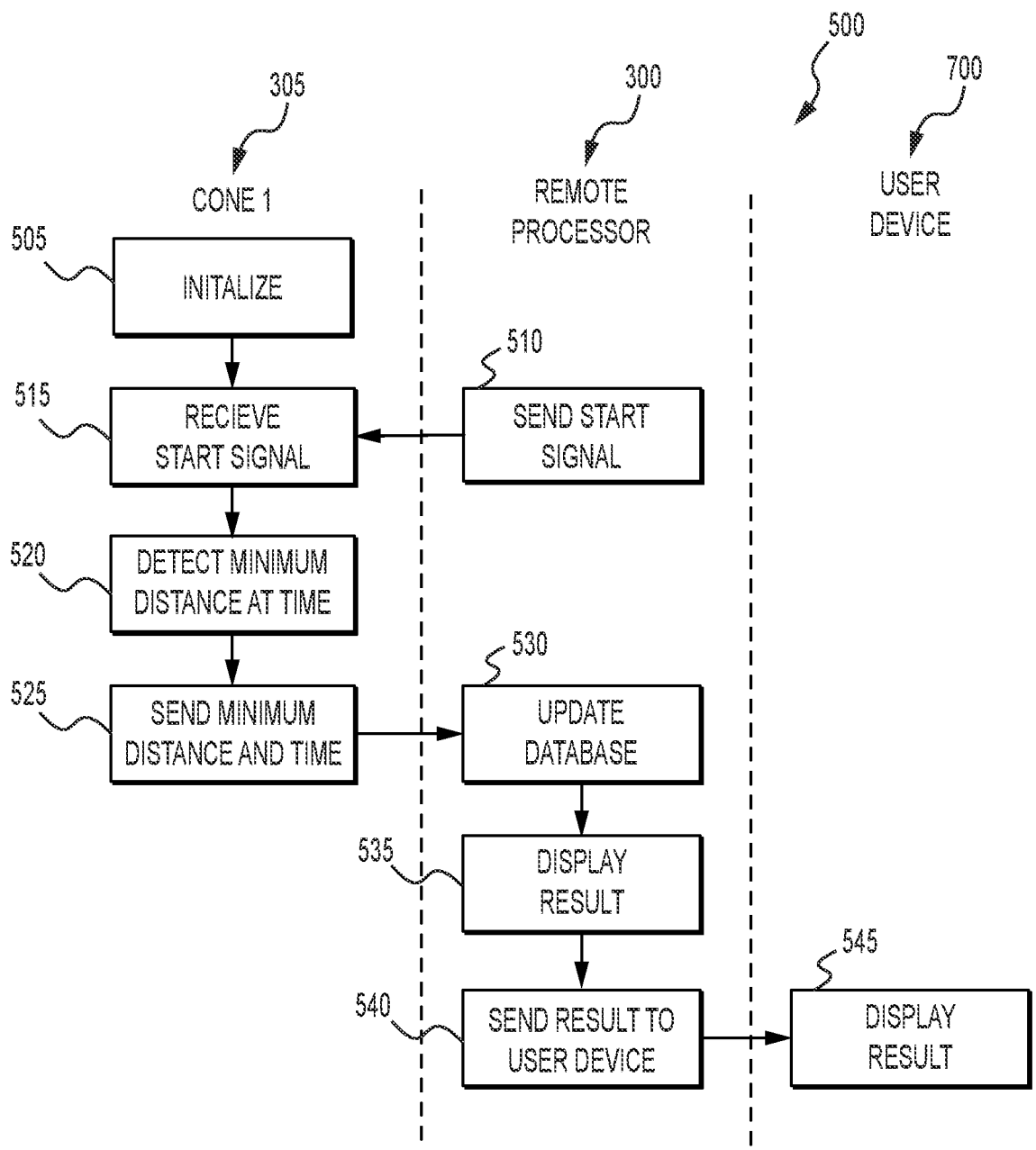
FIG. 5 illustrates a flow diagram of a method according to some embodiments.

Referring to FIG. 5, a system may include a traffic control device (e.g. cone 1 305), the remote processor 300, and a user device 700. The system may perform a method 500 including initializing the traffic control device at step 505, sending a start signal from the remote processor to the cone at step 510, and receiving the start signal from the remote processor at step 515. The step of initializing the traffic control device may include setting the threshold distance associated with the addition of a penalty to a recorded time of a run. The method 500 may further include detecting a minimum distance at a timestamp for when the minimum distance was recorded at step 520, and sending the minimum distance and the timestamp to the remote processor at step 525. In at least one example embodiment, the processor 215 include hardware, logic, or a combination of hardware and logic that adds the timestamp to the minimum distance. In another example, the timestamp may be recorded by another module. The remote processor 300 may update a database with the minimum distance and the timestamp at step 530, and display a result at step 535. The remote processor 300 may record, for example, a run time, any penalty time, and a resulting final time at step 530. The run time, any penalty time, and the resulting final time may be added to the database and associated with the vehicle or driver, for example. The remote processor may send a portion of the data from the database (or the entire database) to the user device at step 540, and the user device may display the data at step 545.

Referring to FIG. 6, the remote processor 300, or another device, may display data in a user interface. For example, the remote processor 300 may display general information 605, for example, including a name of a course and a date. The remote processor 300 may display data associated with a first driver 610 and data associated with a second driver 615. The data associated with a driver may include, for example, a list of the traffic control devices 620, e.g., cone 1, and times 625 associated with the driver. The remote processor 300 may process and display other data. For example, the remote processor 300 may display a map of the course, weather conditions recorded for the day, or information about each driver's vehicle. In some example embodiments, the list of traffic control device 620 may include an indication of an event causing a penalty. For example, the data indicates that cone 3 has been knocked over ("over").

Figure 7:
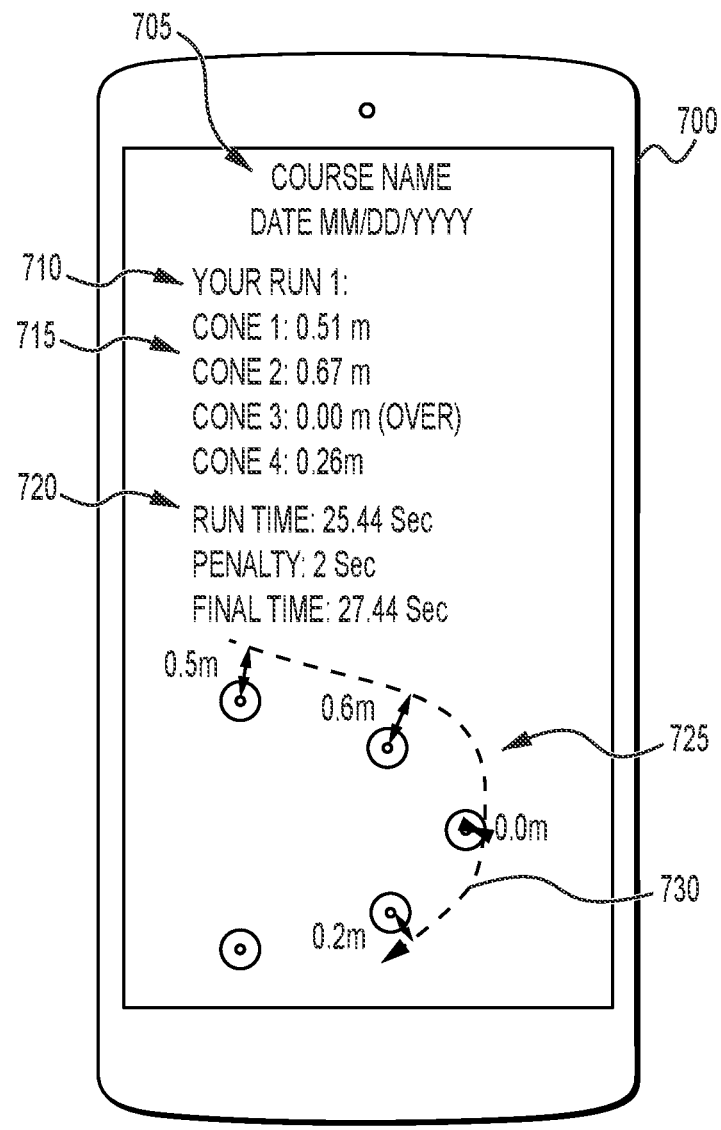
FIG. 7 illustrates a user device and a user interface according to some embodiments.

Referring to FIG. 7, the user device 700 may display data in a user interface. For example, the user device 700 may receive data received from the remote processor 300 or data received directly from a traffic control device. The user device 700 may display general information 705 and data associated with a user 710, e.g., the first driver. The data associated with a user may include, for example, a list of the traffic control devices 715, e.g., cone 1, and time data 720 associated with the user. The user device 700 may process and display other data. For example, the user device 700 may display a map of the course 725, weather conditions recorded for the day, or information about the driver's vehicle. The data received from the traffic control devices, including for example, the minimum distances and timestamps, may be used to generate a line 730 representing the run.

As illustrated by the list of the traffic control devices 715, the data may include a minimum distance recorded by each traffic control device and whether the traffic control device was knocked over. The time data 720 may include any penalty times incurred by the user, and a final time including the run time and the penalty time. For example, the data may enable the remote processor 300 or the user device 700 to automatically generate a display of the traffic control devices and a track of the vehicle along the course, and other information.

In some examples, the traffic control device and the user device may be used to inform a driver of the actual distances between the vehicle and the cones on a course during a run (e.g., how close the vehicle came to the cones). For example, the communications module 115 may transmit data, such as distances and indications of impacts, to one or more of the remote processor 300 or the user device 700. The driver may then be able to use the data to improve a racing line on a next run, in order to get closer to a faster racing line without knocking any cones over and incurring a penalty.

In some examples, data collected by the traffic control device may be transmitted to the remote processor 300 upon the traffic control device 100 measuring the data. As described here, the communications module 115 may transmit data, such as distances and indications of impacts, to one or more of the remote processor 300 or the user device 700. This data may be real-time data or data that is recorded during a run and stored or transmitted at a later time. The real-time data, such as data about the distances or impacts, may be automatically transmitted to and displayed, for example, by the user device 700, while a driver is completing a lap, for example.

In an example where the remote processor 300 is a remote server, the remote server may automatically transmit the data to the user device 700 in real-time as the data is received from the traffic control device. That is, data may be indirectly provided to the user device 700 or another processor. In some examples, the remote processor 300 may make the data available to the user device 700. For example, the remote server may be associated with an application program interface (API) that enables the user device 700 to access the data stored in a database. In at least one example, stored data may be automatically transmitted after the completion of a lap of the track, a race, or an event including one or more laps or races, or at another time. The data may enable a post lap or post race analysis.

Figure 8:
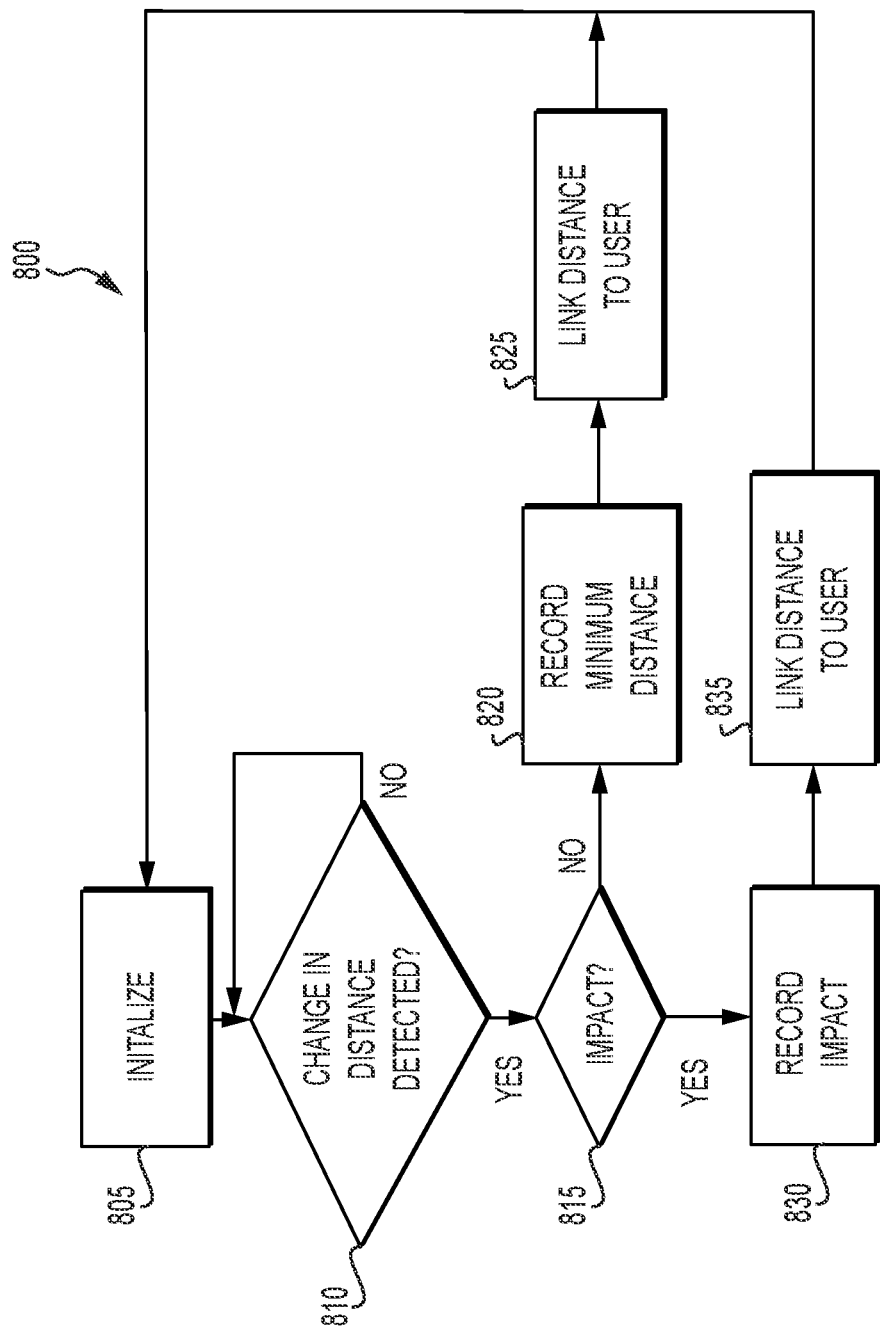
FIG. 8 illustrates a flow diagram of a method according to some embodiments.

A traffic control device according to example embodiments may be used for various implementations and is not limited to the case of an autocross event. For example, the traffic control device 100 may be used for driver training or city planning. For example, as illustrated in FIG. 8, a training method 800 may include initializing a traffic control device at step 805. The initialization at step 805 may establish a connection with a user device or a vehicle's computer. The user may be, for example, a student driver, a driving coach, or a traffic management professional. The traffic control device may detect changes in distance at step 810, and if a change is detected, the traffic control device may detect an impact at step 815.

In a case where no impact is detected at step 815, the traffic control device may record a minimum distance to the vehicle at step 820 and link the recorded data to the user at step 825. For example, at step 825, the recorded data may be used to update a database or to display a representation of the vehicle relative to the traffic control device.

In a case where an impact is detected at step 815, the traffic control device may record the impact at step 830 and link the recorded data to the user at step 835. For example, at step 835, the recorded data may be used to update a database or to display a representation of the vehicle relative to the traffic control device.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

I claim:

1. A system for tracking a vehicle, comprising:
   a plurality of traffic control devices;
   a user device including a remote processor and disposed in a location remote from the plurality of traffic control devices;
   wherein each of the plurality of traffic control devices includes:
   a distance module configured to detect a distance to an object; and
   a communications module configured to, for each vehicle passing in proximity to the plurality of traffic control devices, transmit first data to the remote processor of the user device;
   wherein the first data includes a passing distance between each of the plurality of traffic control devices and each vehicle passing in proximity to the plurality of traffic control devices; and
   wherein the remote processor of the user device is configured to display the first data regarding multiple vehicles and multiple traffic control devices on the user device.

2. The system of claim 1, wherein the distance module comprises a distance sensor.

3. The system of claim 2, wherein the distance sensor comprises:
   a transmitter; and
   a receiver.

4. The system of claim 2, wherein the distance sensor is one of a Light Detection and Ranging (LiDAR) device, a light emitting diode (LED) time-of-flight sensor, an infrared (IR) distance sensor, or an ultrasonic sensor.

5. The system of claim 1, wherein the impact detection module comprises an accelerometer.

6. The system of claim 1, wherein the communications module comprises at least one of a wireless data transmitter or a wireless data receiver.

7. The system of claim 6, wherein the wireless data receiver is configured to receive identification data corresponding to the object.

8. The system of claim 7, wherein the communications module is further configured to transmit the identification data.

9. The system of claim 1, wherein each traffic control device further includes an impact detection module configured to detect an impact on the traffic control device;
   wherein the communications module is further configured to transmit second data to the remote processor of the user device for each vehicle passing in proximity to the plurality of traffic control devices;
   wherein the second data includes an indication of whether each of the plurality of traffic control devices has been impacted; and
   wherein the remote processor of the user device is configured to display information regarding the second data on the user device.

10. The system of claim 1, further comprising a location and movement tracking module.

11. A method of tracking a vehicle, the method comprising:
   initializing a plurality of traffic control devices;
   detecting a change in a distance between each traffic control device and each vehicle passing in proximity to the traffic control device;
   communicating the distance to a remote processor of a user device; and
   displaying the distance between multiple vehicles and multiple traffic control devices on the user device.

12. The method of claim 11, wherein the initializing further comprises connecting the traffic control device with at least one of the remote processor and another traffic control device.

13. The method of claim 11, wherein the initializing further comprises receiving a signal indicating that a run of a course has commenced.

14. The method of claim 11, further comprising:
   detecting that at least one of the plurality of traffic control devices is not upright; and
   sending a signal to the remote processor indicating that the traffic control device is not upright.

* * * * *